(Model.)
F. A. HAVENS.
WHIFFLETREE HOOK.
No. 269,500. Patented Dec. 19, 1882.
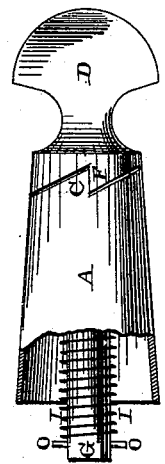
Witnesses:
Louis F. Gardner
W. H. Kern
Inventor:
F. A. Havens,
per
F. A. Lehmann,
atty.

UNITED STATES PATENT OFFICE.

FREDERICK A. HAVENS, OF SOUTH WETHERSFIELD, CONNECTICUT.

WHIFFLETREE-HOOK.

SPECIFICATION forming part of Letters Patent No. 269,500, dated December 19, 1882.

Application filed September 19, 1882. (Model.)

*To all whom it may concern:*

Be it known that I, FREDERICK A. HAVENS, of South Wethersfield, in the county of Hartford and State of Connecticut, have invented certain new and useful Improvements in Whiffletree-Hooks; and I do hereby declare the following to be a full, clear, and exact description of the invention, such as will enable others skilled in the art to which it pertains to make and use it, reference being had to the accompanying drawing, which forms part of this specification.

My invention relates to an improvement in whiffletree-hooks; and it consists in the combination of a ferrule having a ratchet formed upon its outer end, with a hook which has a corresponding ratchet formed upon it, and which is provided with a shank which extends through the ferrule and has a spiral spring placed around it, so as to always cause the hook to snap back into place after having been moved, as will be more fully described hereinafter.

The object of my invention is to provide a whiffletree-hook which can be turned freely around without having first to pull it outward, and which will snap back into position as soon as released.

The accompanying drawing represents my invention partly in section.

A represents the ferrule, which is to be applied to the end of a single-tree, and which has a ratchet, C, formed on its outer end. The hook D, over which the end of the trace is fastened, has a corresponding ratchet, F, formed upon it, and the hook is provided with a shank, G, which passes back through the ferrule and has the spiral spring I applied thereto. This spring is held between the inner end of the ferrule and the stop O upon the end of the shank, so that it is always exerting its power in pulling the hook inward, so that whenever released it will at once snap back into position against the end of the ferrule. There are preferably four of these ratchets made upon the ferrule and the hook, so that a quarter-turn will be given the hook each time it is moved. This quarter-turn will turn the hook from a horizontal position into a line with the hole through the end of the trace to a vertical or nearly vertical position, and thus hold the hook in such a position that the trace cannot work off. The great advantage of this ratchet consists in the fact that there is no necessity of first having to pull the hook outward. It is only necessary to give the hook a backward turn, when the ratchets cause it to move outward their full length, and then as it snaps from one to the other a spring exerts its power upon it and causes it to snap back upon the end of the ferrule.

I am aware that it is not new for the hook to have both an endwise and a revolving motion, and that the end of the ferrule has been provided with a notch in its end to hold the hook in one position, and this I disclaim.

Having thus described my invention, I claim—

The combination of the ferrule A, having the ratchet C formed upon its end, the hook D, having its inner end formed so as to close the outer end of the ferrule and provided with the ratchet F, the rod G, and spring, substantially as shown and described.

In testimony whereof I affix my signature in presence of two witnesses.

FREDERICK A. HAVENS.

Witnesses:
 SAM L. G. CRANE,
 T. M. MALTBIE.